Sept. 9, 1958 C. L. WELLINGTON 2,851,226
AUTOMATIC LOADING AND UNLOADING WINDING ARBOR
Filed April 26, 1955 2 Sheets-Sheet 1

FIG. I

INVENTOR
CARY L. WELLINGTON
BY
ATTORNEYS

Sept. 9, 1958 C. L. WELLINGTON 2,851,226
AUTOMATIC LOADING AND UNLOADING WINDING ARBOR
Filed April 26, 1955 2 Sheets-Sheet 2

INVENTOR
CARY L. WELLINGTON
BY
ATTORNEYS

United States Patent Office 2,851,226
Patented Sept. 9, 1958

2,851,226

AUTOMATIC LOADING AND UNLOADING WINDING ARBOR

Cary L. Wellington, Stamford, Conn.

Application April 26, 1955, Serial No. 503,923

20 Claims. (Cl. 242—67.1)

This invention relates to improvements in winding machines and particularly in the winding arbor and its associated mounting parts of such machines. One improvement provided by this invention makes possible the automatic loading and unloading of a winding arbor. Another improvement makes possible the automatic indexing of the arbor so that when it is loaded, the arbor will always be in the same angular position relative to its frame.

In order to facilitate loading and unloading, winding machine arbors are ordinarily made in two cooperating axially coextensive parts. These parts are arranged in the arbor so that one end of the material to be wound may be held between them. In loading the winding machine, one part of the arbor is removed so that the end of the material to be wound may be placed in position to be clamped between the two members. The part which has been removed is then replaced and the winding may proceed.

Following the winding and the finishing of the wound package, the removable part of the arbor is again removed by sliding it axially in a process known as stripping. In the stripping process, the end held between the arbor parts is freed. After the removable arbor part has been removed from the package, the package itself can be easily removed from the other arbor part. Then, while the removable arbor member is out of place, the end of the material which will constitute the next wound package may be placed in position before the removable arbor piece is replaced.

Prior art machines require an operator to strip, remove and reload a winding machine by hand or by mechanical aid requiring multiple mechanical movements. The machine of the present invention is capable, with the aid of appropriate feeder, cutter and gluing devices, to make complete wound packages without manual work at any point. Accordingly, the machine of the present invention may be made to automatically load, wind, strip and remove a wound package without the aid of an operator. In the alternative, it may be operated manually. Since the preferred form of the present invention requires but a single cycle of a linear (axial) reciprocal motion to do all of its operations excepting the winding, a machine embodying its features may be manually operated as well. However, the automatic actuating machinery required to produce this linear, reciprocating actuation is so simple that in most instances it will be preferred to manual operation in order to replace the operation with a single attendant to supply the machines initially and collect their products.

The machine of the present invention employs an arbor which operates on the same principle as manual operation. However, by preserving the axial alignment of the arbor parts and by withdrawing them both in the same direction, it is possible to reduce to a single operational movement the operations which involve several movements in the prior art.

More specifically, the machine of the present invention consists of a machine having an arbor consisting of a pair of axially coextensive mating parts which are mated when the machine is in winding position. A mounting member is provided for each of the arbor parts, and means is provided to interconnect the arbor mounting members to prevent relative rotation but to permit limited relative axial movement between said parts. A drive member is provided in order to supply the necessary rotational movement for the actual winding process. This drive member is interconnected with one of the arbor mounting members in such a manner as to permit limited axial movement therebetween but to prevent relative rotational movement. A frame is supplied for supporting the drive member and the mounting members and bearing means is provided between the frame and the supported members for permitting relative rotational movement therebetween. In this machine the members which are axially movable relative to the frame are so arranged that each may all be held in its winding position during winding and separately withdrawn from and returned to its winding position during unloading and loading. The winding position for any structural element of the machine of this invention is that axial position which that element maintains during winding.

In a preferred construction of the present invention, portions of the respective arbor mounting members and a portion of the drive member are all coaxially arranged on the axis of rotation with the drive member in the outermost position. The coaxial members are advantageously made to snugly engage one another in a manner which facilitates relative sliding. Such an arrangement is advantageous because it aids in preserving the axial alignment of the whole device and in holding the mating arbor parts in proper relationship with one another. The interconnection means between the axially movable members is advantageously arranged so that axial movement out of winding position can occur in only one direction. A spring member is interposed between the arbor mounting members in order to urge them axially apart in such direction that as one member is axially withdrawn from winding position the other will be urged to remain in winding position until said one is completely withdrawn.

In order that the arbor will be in the proper angular position to be loaded by whatever automatic machinery is employed or to facilitate loading by hand, it is desirable to have an automatic indexing means which will insure that the arbor parts lie in exactly the same angular position each time the arbor is loaded. The present invention provides a simple indexing means which automatically adjusts the angular position of the arbor using a single cycle of linear reciprocating motion. This indexing device is useful apart from the loading and unloading device of the present invention, but it is particularly well adapted for use in cooperation with the structure already described.

More specifically, the automatic indexing means consists of an arbor mounting member which is supported in a manner which permits rotation relative to its supporting frame and relative movement along the axis of rotation. The means producing the indexing is a cam and follower. The cam has a helical surface of one revolution which is so located that its axis is on the axis of rotation and the ends of the helical surface are connected by a shoulder parallel to the axis of rotation. The cam is arranged on one of the relatively rotatable parts and the follower is arranged on the other. Accordingly, as the arbor mounting member is withdrawn the follower will engage and follow the cam surface until it lies against the axial shoulder.

In the preferred construction of the present invention the two devices described above are combined by superimposing the automatic loading and unloading device on the automatic indexing device. While the automatic indexing means requires no more than one arbor mounting member, the use of two arbor mounting members is possible provided the two members are interconnected so that they will not rotate relative to one another. Since both arbor mounting members move axially relative to the frame, it is possible to mount one element of the cam or follower on one of the arbor mounting members and the other element on the frame.

For a better understanding of the present invention, reference is made to the following drawings.

Figure 1:
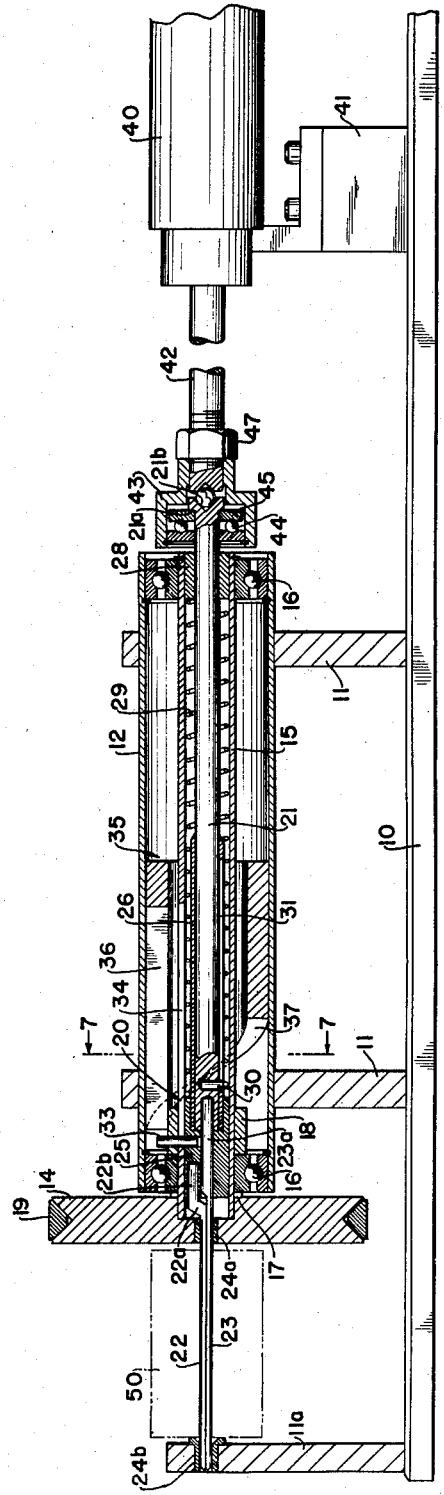
Fig. 1 illustrates in axial section a preferred embodiment of the improved machine of the present invention with the arbor in winding position.

The structure of the present invention is best seen by reference to Fig. 1. For the sake of simplicity certain parts of the structure have been schematically illustrated since they may assume a wide variety of forms and shapes in various practical embodiments of the present invention. The supporting frame 10, for example, has merely been shown as a heavy plate, but, of course, it could be of any shape useful or desirable in some other connection. Likewise the supporting brackets 11 may be of any satisfactory form in addition to that illustrated. However, it is desirable that the housing 12, which is mechanically part of the supporting frame structure, be essentially cylindrical in order to facilitate the mounting of the arbor supporting members therein.

Rotatably mounted relative to housing 12 is a drive member which advantageously consists of a pulley 14 and a tubular member 15 which are rigidly connected to one another. Tubular member 15 lies within and preferably extends the full length of housing 12. Frictionless bearings 16 are provided at opposite ends of the housing between the housing and the tubular portion of the drive member in order to facilitate relative rotational movement therebetween. The bearings 16 may be held in place by snap rings or other conventional means. However, the inner race immediately adjacent the pulley 14 is held against an annular separator 17 between it and pulley 14. Ring 18 on the other side of said inner race is slidably fitted over tubular drive member 15. This bearing arrangement will not permit any relative axial movement between housing member 12 and drive member 15. The actual power to produce rotation of the drive member may be supplied by a motor through a V-belt 19, or by other suitable means.

Arbor mounting member generally designated 20 is located coaxially within member 15. Arbor mounting member 21 is in turn located coaxially within arbor mounting member 20. The arbor itself is advantageously composed of two parts which are mating and preferably axially coextensive. It will be obvious that the mounting members and their supported arbor parts may be integral instead of two pieces as shown. It may not be necessary to make the arbor parts actually coextensive in every case but they must at least be coextensive over that portion which holds the end of material to be wound. For applications involving the winding of tape, for example, it is desirable that the arbor parts be coextensive over a distance equal to the width of the tape so that it will be possible to clamp the whole width of the tape between them. In the construction shown, the arbor parts are advantageously semi-circular and are mated in such a fashion that the two of them provide an arbor of circular cross-section. The split arbor permits the insertion of the end of material to be wound between the two arbor parts 22 and 23 prior to winding, as will be discussed and described hereafter.

The arbor mounting member 20 is actually composed of at least two parts rigidly fixed together. One part is a cylindrical block 25 and the other part is tubular member 26. Block 25 is advantageously made to snugly engage the inside walls of drive member 15 in order to provide sliding contact therebetween. Block 25 is also the actual supporting member for the arbor part 22. Arbor part 22 has a supporting shank 22b which is embedded in the block 25 of arbor mounting member 20. A bend 22a in the structure of the arbor part causes the shank 22b to be off-set from the axis.

Arbor mounting member 21 is much simpler and is advantageously a rod-like member which slides within tubular member 26. Shank 23a of arbor part 23 passes through an axial hole in arbor mounting member 25 and is embedded in, or otherwise rigidly affixed to, arbor mounting member 21.

Arbor mounting member 21 is provided with a radial shoulder by annular block member 28 which is affixed to said arbor mounting member and is advantageously in sliding contact with drive member 15 in order to preserve its coaxial arrangement. Between the shoulder formed by block member 28 and cylindrical member 25 of arbor mounting member 20 extends a helical spring 29. The tubular drive member 15 which encloses the helical spring helps keep the spring in axial alignment. The spring 29 is under compression in Fig. 1 so that it has a tendency to urge the arbor mounting members 20 and 21 axially apart.

Relative rotational movement is prevented between the arbor mounting members by interconnection means. This interconnection means consists of a radially extending pin 30 mounted on arbor mounting member 21 and an axially extending slot 31 in arbor mounting member 20, or specifically in tubular portion 26 thereof. It is, of course, possible to interchange the pin and the slot in their relative positions. In fact, various other types of interconnection means may be substituted for the pin and slot. However, the pin and slot arrangement is preferred because of its simplicity. The pin and slot afford the required freedom of relative axial movement between the arbor mounting members 20 and 21 and limit the amount of relative axial movement. The amount of movement is limited by the length of the slot. With many types of connection means separate stops must be employed. In the preferred form of the structure, the slot is arranged so that when the arbor parts are in winding position, there can be relative axial movement in only one direction between the arbor mounting members.

Relative rotational movement between the outer arbor mounting member and the drive member is prevented by pin 33 on arbor mounting member 20 which pin rides in axial slot 34 in member 15. Again, the relative arrangement of pin and slot is such that when arbor part 22 is in winding position, there can be relative axial movement between its arbor mounting member 20 and the drive member in only one direction. Furthermore, that one direction of movement out of winding position is advantageously the same direction relative to the frame as is the movement of the arbor mounting member 21. As in the case of the interconnection means between the arbor mounting members, it is possible to interchange the positions of the pin and the slot in this instance, or it is possible to use other interconnection means.

The term "axial" as used herein is not intended to mean literally "on the axis of rotation" but rather "parallel to the axis of rotation." "Axial" is used herein to describe the direction of the slots of the connection means between relative axially movable members and, as will hereafter appear, to describe the orientation of a shoulder in connection with the cam employed in the indexing means.

Figure 6:
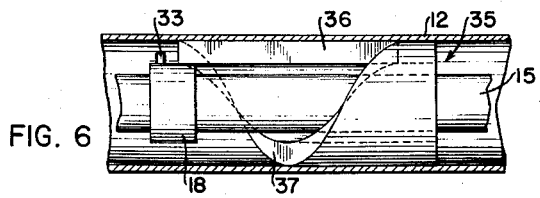
Fig. 6 is a partial view showing in elevation the cam and follower employed in the indexing device of the present invention.
Figure 7:
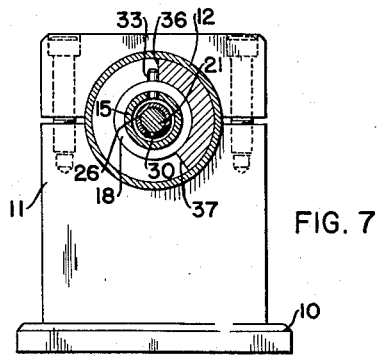
Fig. 7 is a sectional view taken along lines 7—7 of Fig. 1 and illustrating the coaxial nature of the preferred form of the present invention.

An indexing means is provided in this preferred form of the present invention in order to assure the same rotational position of the arbor every time during loading of the arbor. This indexing means consists of a cam generally designated 35 and a cooperating follower. The cam has a helical cam surface with its axis on the axis of rotation of the arbor. A single turn of the helix is employed and an axially arranged shoulder 36 is employed to interconnect the ends of the helix. In the preferred form of the invention, the cam which is best shown in Fig. 6 is affixed to the inner surface of the housing member 12. The follower is preferably provided by pin 33 which also serves as part of the interconnection means between the outer arbor mounting member and the drive member. In winding position the pin 33 is axially in a position beyond the cam. However, this radially extending pin will be axially withdrawn as its supporting arbor mounting member 25 is withdrawn so that at some point it will strike cam surface 37. Thereafter, as axial withdrawal continues pin 33 will follow said cam surface until it finally lies against shoulder 36. When lying against shoulder 36, it will be in the correct position for loading.

The arrangement and cooperation of the relatively movable parts of the structure of Fig. 1 make it possible to produce all necessary relative movements between the parts by the axial withdrawal and return of one of the arbor mounting members, and in particular arbor mounting member 21. Withdrawal and return may be done manually or either or both may be done by automatic actuation means. However, a single means for automatically withdrawing and returning the arbor mounting member is preferred. Such a means is an air cylinder 40 which may be supported on suitable bracket means 41 from the supporting frame 10. In the alternative, means such as a solenoid or similar actuation device may be employed. A shaft 42 is employed to transmit the force from the actuating device to the arbor mounting member 21. Shaft 42 is axially aligned with the arbor mounting member 21. In order to join these two members a coupling member 43 is supplied and it is attached to the rod-like member 42. This coupling member supports a ball bearing 44 which has planar races, as illustrated. The bearing structure may be held in place within the coupling member 43 by a snap ring or other suitable means. The race affixed to the arbor mounting member 21 may be held in place against a shoulder 21a thereof. The end of the arbor mounting member 21 is advantageously provided with a conical groove 21b which accepts ball 46. Coupling member 43 has an opposed conical groove which also accepts ball 46.

The single ball 46 and the ball bearing 44 permit the relative rotation to occur between arbor mounting member 21 and shaft 42. Adjustment is possible in coupling member 43 because nut 47 which threadably engages shaft 42 is fixed rigidly to the coupling member and this adjustment permits tightening on ball 46. A great many other types of coupling devices are possible and equally satisfactory, the coupling device shown and described being shown merely by way of example.

In order to afford support for the end of the arbor remote from the arbor mounting members, there is provided a bearing member 24b which accepts the end of the arbor member when it is in winding position. This bearing member 24b may be mounted in a support bracket 11a similar to the support brackets used to support the rest of the structure.

Referring now to Figs. 1–5, the successive stages of operation of the apparatus of the present invention are shown. Referring first to Fig. 1, the apparatus is shown in winding position. In this position, the winding occurs to produce a wound package 50. This particular embodiment of the apparatus of the present invention is designed to wind tape into a cylindrical package. This is accomplished by holding one end of the tape 51 between the arbor parts 22 and 23 and then commencing winding until a package of desired size is obtained. When the package is of desired size, the tape is cut and the free end of the tape may be secured to the package by gluing or other available means. The means of cutting and sealing the end of the package are generally of types well known in the art. Accordingly, the scope of this application need not be expanded to describe them in detail.

Stripping is accomplished by axially moving arbor part 23 out of winding position. Such axial removal of arbor part 23 frees the end of the tape held at the center of the wound package and makes the package itself more easily withdrawn from the other arbor part. The axial withdrawal of the arbor part 23 is accomplished in response to the axial withdrawal of the shaft 42 which causes axial withdrawal of arbor mounting member 21. It will be appreciated that arbor parts 22 and 23 are slightly tapered to facilitate withdrawal of member 23 from the package during stripping. As arbor mounting member 21 is withdrawn relative to arbor mounting member 20 pin 30 rides in slot 31 which, as previously described, is axial, so that relative rotational movement is not possible between the arbor mounting members. The relative axial movement between the arbor mounting members is aided by spring member 29. As arbor mounting member 21 is withdrawn relative to arbor mounting member 20, the spring urges the cylindrical portion 25 of arbor mounting member 20 to remain in winding position.

Figure 2:
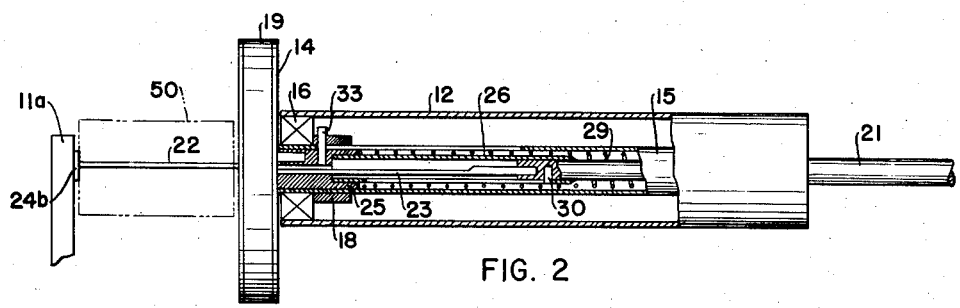
Fig. 2 shows in partial axial section the structure of Fig. 1 showing one of the arbor parts withdrawn from winding position just after completion of the stripping operation.
Figure 3:
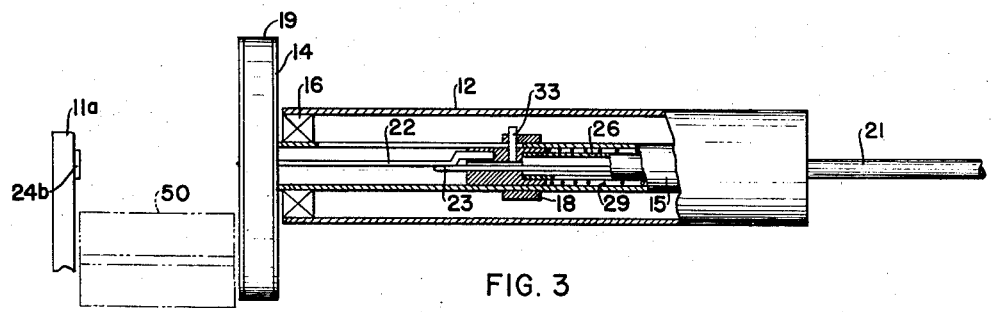
Fig. 3 is a view similar to that of Fig. 2 showing both arbor parts withdrawn from winding position in order to effect unloading of the machine.

When stripping is completed as shown in Fig. 2, the arbor part 22 may then be removed. Axial movement of the mounting member 20 for supporting arbor part 22 will not occur, however, until the full amount of relative axial movement between the arbor mounting members 21 and 22 has been completed. In the preferred form of the invention as shown in Figs. 1–4 the completion of the relative axial movement between the arbor mounting members 20 and 21 will occur when the pin 30 reaches the end of the axial slot 31. Thereafter withdrawal of arbor mounting member 21 will also cause withdrawal of arbor mounting member 20.

As arbor mounting member 20 is withdrawn the arbor part 22 is withdrawn from the load and eventually the wound package 50 is freed and drops from the arbor part. In the construction illustrated the package may be pulled against the pulley 14 which acts as a stop to prevent the axial movement of the package as the arbor mounting member 22 is withdrawn. As arbor mounting member 20 is withdrawn it moves relative to the drive member and particularly to the tubular portion 15 of the drive member. Axial slot 34 in combination with pin 33 prevents relative rotation between the drive member and the arbor mounting member 20. In this instance, the pin 33 either continues moving until it strikes shoulder 36 of the cam member or if a cam member is not employed in the particular version of this structure until it reaches the end of its slot 34.

Figure 4:
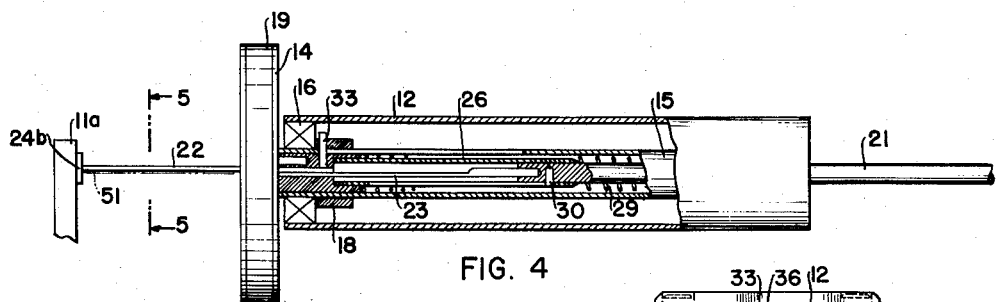
Fig. 4 is a view similar to those of Figs. 2 and 3 showing the arbor in loading position with one part in winding position and the other withdrawn.
Figure 5:
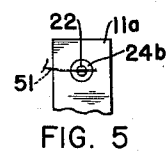
Fig. 5 is a sectional view taken along line 5—5 of Fig. 4.

In order to reload the arbor the position of Fig. 4, which is similar to the position of Fig. 2 after stripping has occurred, is assumed. In order to accomplish this, the direction of movement of shaft 42 is reversed and the arbor mounting member 21 is caused to move axially back toward its winding position. Because of the urging of spring member 29, the arbor mounting members will be held axially apart as the arbor mounting member 21 is advanced so that the arbor part 22 on arbor mounting member 20 will reach winding position before arbor part 23 does. When arbor part 22 is in winding position, feed means may supply the end of the tape or other material to be wound against the bottom of the arbor part 22 as shown in Fig. 5. The exact nature of the feed means is not within the scope of the present application and accordingly will not be described in detail. Although automatic feed means is preferred, it is possible for the feeding to be done by hand. When pin 33 reaches the end of slot 34 arbor part 22 is in winding position and there can be no further axial movement between drive member 15 and the arbor mounting member 20. Thereafter, the only relative axial movement which can occur is between arbor mounting member 21 and drive member 15 or, more specifically, between the respective drive members. Accordingly, as the shaft 42 is advanced, it drives arbor mounting member toward winding position against the urging of spring 29 until pin 30 reaches the end of slot 31, as is shown in Fig. 1, at which point arbor part 23 is in winding position. Thereafter, with the end of the material to be wound held between the arbor parts, the winding process may occur. During the winding process, the arbor parts will be held against axial movement in winding position. If an automatic actuation means is not employed, or if it is not satisfactory for the purpose, some other means of holding the arbor parts in winding position may be employed.

In the preferred construction of the present invention, the indexing means is also employed. As previously mentioned, the indexing means consists of a single turn helical cam 37 having an axial shoulder 36 interconnecting the ends of the cam. Since the cam is arranged coaxially with the axis of rotation, as the arbor mounting members are withdrawn relative to the frame on which the cam is supported, contact will occur at some point between pin 33 and the cam. In considering the loading and unloading action of the device, we have assumed that the arbor parts always finish their winding rotation in a certain fixed rotational position. In practice this is not so. However, in order to facilitate loading, especially if loading is to be done by machine, it is important to have the arbor parts arranged in the same relative rotational position each time the arbor is loaded. It is possible to adjust the arbor parts to proper position by adjusting the mounting members, and specifically the pin 33 relative to housing 12 of the supporting frame. No matter what position the arbor, and hence pin 33, assumes after winding, the pin 33 will strike some portion of the helical cam surface as the arbor mounting member 20 is axially withdrawn. Once it strikes cam surface 37, the pin will tend to follow said cam surface until it eventually strikes the axial shoulder 36. The impact on pin 33 might cause it to bend were it not for ring 13 which moves with pin 33 so that the pin is subjected to shearing force rather than to a bending couple. There can be no further relative axial withdrawal of the arbor mounting member 20 relative to the frame and drive member once the pin lies against shoulder 36 and in this position the rotational position of the arbor mounting members will always be the same, i. e. with the pin lying against shoulder 36. Then as the arbor parts are returned to the winding position, the pin 33 will remain in position adjacent shoulder 36 so that in the loading position illustrated in Fig. 4, the arbor part 22 will always have the position shown.

Various modifications and changes in the invention as described, in addition to those already pointed out, will occur to those skilled in the art. All such changes and modifications within the scope of the claims are intended to be within the scope and spirit of the present invention.

I claim:

1. An automatic loading and unloading arbor for a winding machine having a pair of arbor members having axially coextensive mating arbor parts which are mated in the winding position of the arbor, an interconnecting member between the arbor members preventing rotation of said arbor members relative to one another but permitting limited relative axial movement therebetween, a rotational drive member, an interconnecting member between one of the arbor members and the drive member, means preventing rotation of said members relative ot one another but permitting relative axial movement therebetween, a frame for supporting the drive member and the arbor members, bearing means interconnecting the frame and the supported members and permitting rotation between the supported members and the frame, stop means on the adjacent members which are axially relatively movable preventing axial movement in one direction from winding position of the respective arbor members, said stop means facilitating the holding of the arbor members in winding position during winding, and spring means between the arbor members and urging them apart in such a manner that as one arbor member is withdrawn the other is urged to remain in its winding position until the full possible relative axial movement between the arbor members occurs.

2. A structure in accordance with claim 1 in which one of the arbor members is tubular and surrounds the other, and a portion of the drive member is tubular and surrounds the outer arbor member.

3. A structure in accordance with claim 1 in which portions of the arbor members and of the drive member are coaxially arranged and at least part of the adjacent coaxial portions are in sliding contact with one another.

4. A structure in accordance with claim 1 in which a portion of the drive member is tubular and surrounds the arbor members and one of the arbor members is tubular and surrounds the other and in which portions of the respective arbor members and the drive member are coaxially arranged and in sliding contact with one another, interconnection means between the tubular drive member and the outer arbor member consisting of a projection from one which is snugly accommodated within an axial slot in the other such that relative rotational movement between the arbor members thus connected is impossible but limited relative axial movement therebetween is possible and interconnection means between the arbor members consisting of a projection from one which is snugly accommodated within an axial slot in the other such that relative rotational movement between the members thus connected is not possible but limited relative axial movement therebetween is possible.

5. A structure in accordance with claim 1 in combination with an automatic indexing means for the arbor wherein a helical cam member is coaxially arranged with the axis of rotation on one of the members which is rotatable and axially movable relative to the other, said cam having a helical cam surface one revolution in length, the ends of which are joined by an axial shoulder, a follower arranged on a member relative to which the cam is axially and rotatably movable, so that during axial withdrawal of the arbor member the follower will contact and follow the cam until it lies against the axial shoulder.

6. An automatic winding machine having a pair of arbor members having axially coextensive mating arbor parts which are mated in winding position, said arbor members having coaxial portions in sliding cooperation with one another, a radially extending pin on one arbor member snugly accommodated within an axially extending slot on a coaxial part of the other, a drive member including a tubular portion arranged coaxially around the outer arbor member in slidable engagement with said outer arbor member, interconnection means between said outer arbor member and the drive member including a radially extending pin on one of said members snugly accommodated within an axially extending slot on a coaxial part of the other member, the pins and slots being so arranged that axial movement of the arbor parts out of winding position can occur in only one direction, a frame for supporting the drive member, bearing means between the frame and the drive member permitting relative rotation therebetween, and spring means between the arbor members so arranged that as one of the arbor members is withdrawn from winding position the other will be urged by the spring to retain its winding position until the total relative axial movement between the arbor members takes place.

7. A structure in accordance with claim 6 in combination with an automatic indexing means for the arbor wherein a helical cam member is coaxially arranged with the axis of rotation on one of the members which is rotatable and axially movable relative to the other, said cam having a helical cam surface one revolution in length, the ends of which are joined by an axial shoulder, a follower arranged on a member relative to which the cam is axially and rotatably movable, so that during axial withdrawal of the arbor member the follower will contact and follow the cam until it lies against the axial shoulder.

8. An automatic loading and unloading arbor for a winding machine having a pair of arbor members having axially coextensive mating arbor parts which are mated in winding position and each of which arbor parts is semi-circular in cross-section, a drive member including a tubular portion, a mounting frame having a tubular portion, bearings between the tubular portions of the drive member and the frame permitting relative rotation therebetween and preventing axial movement of the drive member, the respective arbor members and the tubular portion of the drive member and a tubular portion of the frame all being coaxially arranged from inside to outside in the order listed, and portions of the arbor members and the drive member being in slidable contact of one another, a radially extending pin on the inner arbor member which is snugly engaged within an axially extending slot on the outer arbor member to permit relative axial movement in only one direction from winding position, a radially extending pin on the outer arbor member which is snugly engaged in an axially extending slot on the tubular portion of the drive member to permit relative axial movement only in the same direction from winding position as permitted by the pin and slot connection between the arbor members, and a helical spring being arranged between a pair of radial shoulders on the respective arbor members so that the outer arbor member will remain in winding position until no further relative axial movement is permitted between it and the inner member and thereafter will move axially with the inner member relative to the drive member.

9. A structure in accordance with claim 8 in combination with an automatic indexing means for the arbor wherein a helical cam is coaxially arranged with the axis of rotation on the housing, said cam having a helical cam surface one revolution in length, the ends of which are joined by an axial shoulder, and a follower arranged on the outer arbor member so that during axial withdrawal of said arbor member the follower will contact and follow the cam until it lies against the axial shoulder.

10. A structure in accordance with claim 8 in combination with an automatic indexing means for the arbor wherein a helical cam is coaxially arranged with the axis of rotation on the housing, said cam having a helical cam surface one revolution in length, the ends of which are joined by an axial shoulder, and wherein the radially outward extending pin on the outer arbor member is made to extend sufficiently far to act as a cam follower so that during axial withdrawal of the arbor members the follower will contact and follow the cam until it lies against the axial shoulder.

11. An automatic indexing means for obtaining exact angular positioning of a winding arbor with respect to its supporting frame, comprising an arbor, and a frame for supporting the said arbor in such a way as to permit rotation of the arbor and axial withdrawal thereof relative to the frame, means causing axial withdrawal of the arbor, a cam having a helical cam surface of one revolution, the ends of which surface are joined by an axial shoulder, and a cam follower, the cam being coaxially arranged on one of the relatively rotatable parts and the follower being arranged on the other so that, in the course of axial withdrawal, the follower will engage and follow the cam surface until it lies against the axial shoulder.

12. An automatic indexing means for obtaining exact angular positioning of a winding arbor with respect to its supporting frame, comprising an arbor, a drive member, means interconnecting the arbor and the drive member to permit relative axial movement therebetween, a frame, bearing means interconnecting the frame and the drive member permitting relative rotation therebetween, so that the frame and the arbor are relatively both rotatable and axially movable, a cam having a helical cam surface of one revolution, the ends of which surface are joined by an axial shoulder, and a cam follower, the cam being coaxially arranged on one of the relatively rotatable and axially movable members and the follower being arranged on the other so that, in the course of axial withdrawal, the follower will engage and follow the cam surface until it lies against the axial shoulder.

13. An automatic indexing means for obtaining exact angular positioning of a winding arbor with respect to its supporting frame, comprising an arbor, a drive member having a part coaxially surrounding said arbor and in slidable engagement with a part of the arbor, interconnection means permitting relative axial but no rotational movement between the drive member and the arbor, a coaxial housing portion on the supporting frame, bearing means permitting relative rotation between the housing and the drive member, a coaxially arranged cam mounted on the housing, and having a single turn helical cam surface interconnected by an axial shoulder, and a follower cooperating with the cam mounted on the arbor.

14. An automatic indexing means for obtaining exact angular positioning of an arbor of a winding machine with respect to the supporting frame of the machine, comprising an arbor, a portion of a rotational drive member coaxially surrounding and slidably engaging a portion of said arbor, a radially extending pin on the arbor snugly engaged in an axial slot in the drive member so that relative axial movement between the arbor and the drive member is possible but relative rotaion therebetween is impossible, a cylindrical housing on the supporting frame, bearing means permitting relative rotation between the cylindrical housing and the drive member which is located coaxially therein, a cam consisting of a single helical turn having its axis arranged on the axis of rotation and the opposite ends of the helical surface joined by an axial shoulder, said cam being mounted on the housing, the radially extending pin from the arbor member providing a cam follower which cooperates with the helical cam as the arbor member is axially withdrawn from its winding position.

15. An automatic loading and unloading arbor for a winding machine comprising, a frame, a pair of arbor members rotatably and linearly movably supported on the frame including an arbor part supported on each arbor member, said parts being arranged to mate and to hold the end of material to be wound between them in winding position, drive means supported on the frame and arranged to cooperate with at least one of the arbor members to produce rotation of the arbor parts when in winding position, actuating means for moving the arbor members in an axial direction and for successively withdrawing the arbor members from winding position and returning them to winding position, means coupling the arbor members such that upon withdrawal of one member from winding position to a specific position the other arbor member will commence to be withdrawn, and a frame supported stop against which packages wound on the arbor are moved in the course of withdrawal of arbor parts to produce removal of the package.

16. A structure in accordance with claim 15 in which both arbor members and hence arbor forming parts are withdrawn in the same direction from their winding position.

17. An automatic loading and unloading arbor for a winding machine comprising a pair of arbor members having mating parts which in the winding position of the arbor are mated in such a way that the end of material to be wound is adapted to be held together between them, means permitting limited relative axial movement between said arbor members to remove them one at a time from winding position, means coupling the arbor members such that upon withdrawal of one member from winding position to a specific position the other arbor member will commence to be withdrawn, a frame for supporting the arbor members and permitting their relative rotation, a drive member on the frame producing rotation of at least one arbor member including means permitting relative axial movement of the arbor member and the drive, and means to synchronize the speeds of rotation of the two arbor members.

18. The winding machine arbor of claim 17 in which the means coupling the arbor members such that upon withdrawal of one member from winding position to a specific position the other arbor member will commence to be withdrawn positively couples together the two arbor members after that specific point so that further withdrawal of the first is necessary to the continued withdrawal of the second arbor member.

19. The winding machine arbor of claim 18 in which the means positively coupling the arbor member is a means interengaging the two arbor members such that both members are withdrawn in the same direction.

20. The winding machine arbor of claim 19 in which the interengaging means is a projection on one limited by shoulders on the other.

References Cited in the file of this patent

UNITED STATES PATENTS

| | | |
|---|---|---|
| 1,073,946 | Bain | Sept. 23, 1913 |
| 1,608,179 | Marchand | Nov. 23, 1926 |
| 1,931,009 | Phelps et al. | Oct. 17, 1933 |
| 2,205,171 | Kile | June 18, 1940 |
| 2,506,314 | Nordberg | May 2, 1950 |
| 2,524,106 | Hanson | Oct. 3, 1950 |

UNITED STATES PATENT OFFICE
CERTIFICATE OF CORRECTION

Patent No. 2,851,226 September 9, 1958

Cary L. Wellington

It is hereby certified that error appears in the printed specification of the above numbered patent requiring correction and that the said Letters Patent should read as corrected below.

Column 6, line 59, for "tublar" read -- tubular --; column 8, line 8, for "ot" read -- to --; column 10, line 55, after "arbor" insert -- mounting --.

Signed and sealed this 18th day of November 1958.

(SEAL)
Attest:
KARL H. AXLINE
Attesting Officer

ROBERT C. WATSON
Commissioner of Patents